United States Patent
Chace et al.

(10) Patent No.: US 10,846,790 B2
(45) Date of Patent: *Nov. 24, 2020

(54) PREPAID LOAD WITH ACCOUNT LINKING

(71) Applicant: Visa International Service Association, San Francisco, CA (US)

(72) Inventors: Justin Chace, Redwood City, CA (US); Glenn Powell, Fremont, CA (US); Craig O'Connell, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 15/698,291

(22) Filed: Sep. 7, 2017

(65) Prior Publication Data

US 2017/0372416 A1 Dec. 28, 2017

Related U.S. Application Data

(63) Continuation of application No. 14/103,702, filed on Dec. 11, 2013, now Pat. No. 9,786,003.

(60) Provisional application No. 61/735,960, filed on Dec. 11, 2012.

(51) Int. Cl.
*G06Q 40/02* (2012.01)
*G06Q 20/28* (2012.01)

(52) U.S. Cl.
CPC .............. *G06Q 40/02* (2013.01); *G06Q 20/28* (2013.01)

(58) Field of Classification Search
None
See application file for complete search history.

(56) References Cited

U.S. PATENT DOCUMENTS

| | | |
|---|---|---|
| 8,280,793 B1 | 10/2012 | Kempkes et al. |
| 2003/0028481 A1 | 2/2003 | Flitcroft et al. |
| 2011/0276436 A1 | 11/2011 | Mullen et al. |
| 2012/0066047 A1 | 3/2012 | Muthugopalakrishnan et al. |
| 2012/0317005 A1 | 12/2012 | Hutson et al. |
| 2012/0323765 A1 | 12/2012 | Spaulding et al. |
| 2014/0279438 A1 | 9/2014 | Reiff et al. |
| 2015/0066757 A1 | 3/2015 | Shenoy et al. |

(Continued)

OTHER PUBLICATIONS

U.S. Appl. No. 14/103,702, "Advisory Action", dated Jun. 8, 2016, 5 pages.

(Continued)

*Primary Examiner* — Joseph W. King
(74) *Attorney, Agent, or Firm* — Kilpatrick Townsend & Stockton LLP

(57) ABSTRACT

Embodiments of the present invention relate to linking a prepaid account with a payment account used to fund the prepaid account. In some embodiments, during payment for a prepaid device, an authorization request message may include a prepaid account identifier associated with the prepaid account. In some embodiments, an activation request message may include a payment account identifier associated with the payment account. A server at the payment processing network may store an association between the prepaid account identifier and the payment account identifier in an account link database. In some embodiments of the invention, if the payment account is canceled, the payment processing network may use the account link database to cancel any associated prepaid accounts, and may transfer funds associated with corresponding prepaid accounts to an issuer associated with the payment account.

10 Claims, 8 Drawing Sheets

(56) References Cited

U.S. PATENT DOCUMENTS

2015/0310424 A1 10/2015 Myers
2016/0203575 A1 7/2016 Madhu et al.

OTHER PUBLICATIONS

U.S. Appl. No. 14/103,702 , "Final Office Action", dated Feb. 12, 2016, 15 pages.
U.S. Appl. No. 14/103,702 , "Non-Final Office Action", dated Jan. 18, 2017, 13 pages.
U.S. Appl. No. 14/103,702 , "Non-Final Office Action", dated Aug. 13, 2015, 19 pages.
U.S. Appl. No. 14/103,702 , "Notice of Allowance", dated Jun. 7, 2017, 11 pages.

PREPAID LOAD WITH ACCOUNT LINKING

CROSS-REFERENCES TO RELATED APPLICATIONS

This application is a continuation application of U.S. application Ser. No. 14/103,702, filed Dec. 11, 2013 which is a non-provisional application of and claims priority to U.S. Provisional Application No. 61/735,960 titled "Prepaid Load With Account Linking," filed Dec. 11, 2012, which is herein incorporated by reference in its entirety for all purposes.

BACKGROUND

Prepaid cards are growing in popularity as a means of providing payment. A prepaid card may be an open-loop branded card such as a Visa™ or MasterCard™, or may be merchant-branded, such as a gift certificate for a specific store. Prepaid cards provide several advantages to consumers such as convenience, security, and easy management.

However, fraud involving prepaid cards is an issue for consumers, merchants, and card issuers. Unauthorized persons may use stolen or misappropriated credit card information to buy prepaid cards. This allows unauthorized persons to quickly put large charges on credit cards. Even though a credit card may be canceled when the unauthorized charges are discovered, the prepaid cards bought with the stolen credit card information can still be used to make purchases after the credit card is canceled, prolonging the damage associated with the fraud.

In addition, prepaid cards may be used to perform money laundering. For example, a legitimate credit card may be monitored by law enforcement agencies. However, if a prepaid card is bought using the legitimate credit card and used for illicit activity, such activity may be concealed. Thus, prepaid cards may be used to obfuscate the use of funds.

Embodiments of the present invention address these problems and other problems individually and collectively.

SUMMARY

Embodiments of the present invention broadly described relate to linking a prepaid account with a payment account used to fund or pay for the prepaid account. In some embodiments, during payment for a prepaid device, an authorization request message may include a prepaid account identifier associated with the prepaid account. In some embodiments, an activation request message may include a payment account identifier associated with the payment account. A server at the payment processing network may store an association between the prepaid account identifier and the payment account identifier in an account link database. In some embodiments of the invention, if the payment account is canceled, the payment processing network may use the account link database to cancel any associated prepaid devices, and may transfer funds associated with corresponding prepaid accounts to an issuer associated with the payment account.

One embodiment of the invention discloses a server computer. The server computer comprises a processor and a non-transitory computer-readable storage medium, comprising code executable by the processor for implementing a method comprising receiving a prepaid account identifier associated with a prepaid account and a payment account identifier associated with a payment account used to fund or to pay for the prepaid account, and linking the prepaid account to the payment account using the prepaid account identifier and the payment account identifier, wherein the prepaid account identifier is retrievable using the payment account identifier.

One embodiment of the invention discloses a method comprising receiving a prepaid account identifier associated with a prepaid account and a payment account identifier associated with a payment account used to fund or to pay for the prepaid account, and linking the prepaid account to the payment account using the prepaid account identifier and the payment account identifier, wherein the prepaid account identifier is retrievable using the payment account identifier.

One embodiment of the invention discloses a method comprising receiving a prepaid account identifier associated with a prepaid account and a payment account identifier associated with a payment account used to fund or to pay for the prepaid account, and sending a message comprising the prepaid account identifier and the payment account identifier, wherein the prepaid account is linked to the payment account, and wherein the prepaid account identifier is retrievable using the payment account identifier.

These and other embodiments of the invention are described in further detail below.

DETAILED DESCRIPTION

Figure 1:
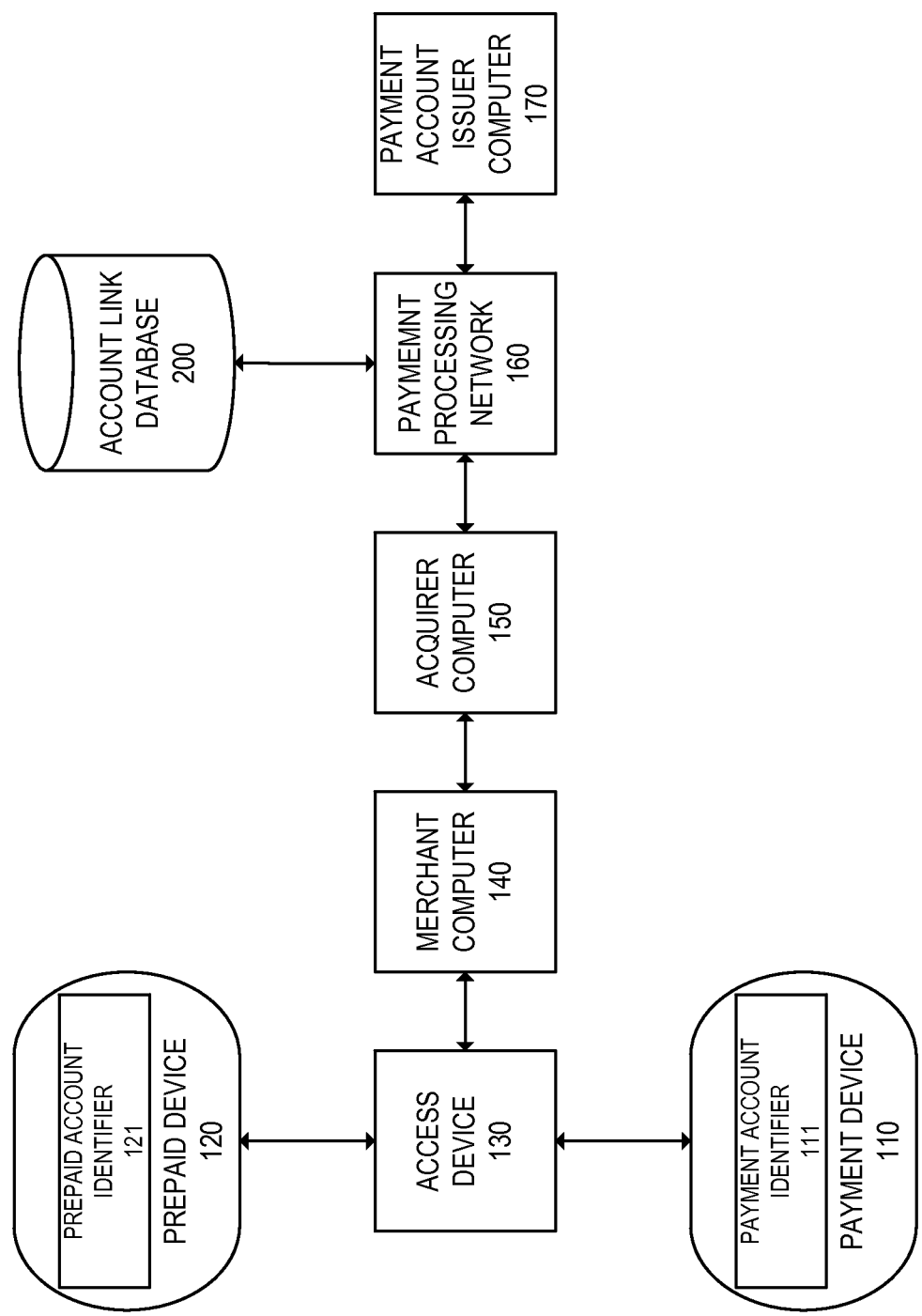
FIG. 1 shows an exemplary system that may be used with embodiments of the invention, whereby a payment device is used to conduct a transaction.

Embodiments of the present invention relate to linking a prepaid account with a payment account used to fund or pay for the prepaid account.

In some embodiments, during a payment transaction for a prepaid device, an authorization request message may include a prepaid account identifier associated with the prepaid device, such as a primary account number (PAN) of the prepaid device. In some embodiments, an activation request message may include a payment account identifier associated with a payment account, such as the PAN of the payment device used to provide funds for the prepaid device. A server at the payment processing network may store an association between the prepaid account identifier and the payment account identifier in an account link database. In some embodiments of the invention, if the payment account is canceled, the payment processing network may use the account link database to cancel any associated prepaid devices, and may transfer funds associated with corresponding prepaid accounts to an issuer associated with the payment account.

Prior to further description of embodiments of the invention, description of some terms may be helpful in understanding embodiments of the invention.

A "payment account" may include any account suitable to conduct payment transactions. A payment account may be associated with a "payment device" and/or a "payment account identifier." For example, a payment account may be a credit card account, a checking account, or a debit card account.

A "payment account identifier" may include any identifier or other data suitable to identify a payment account. For example, a payment account identifier may be a primary account number (PAN), a bank account number, or a username. In some cases, a payment account identifier may be embossed on or be included in or stored on a payment device.

A "payment device" may include any device or apparatus operable to conduct payment transactions using a payment account. Examples of payment devices may include credit cards, debit cards, contactless devices, and mobile devices, payment checks, etc.

A "prepaid account" (which may be associated with a "prepaid device" and a "prepaid account identifier") may include any account funded with an amount of currency. Examples of prepaid accounts may include a gift card account, a debit card account, and an account associated with a stored-value card. A prepaid account may be closed-loop (i.e., operable only at a set of merchants), open-loop (i.e., operable through a payment processing network such as Visa™ or MasterCard™), or operable in any other suitable manner.

A "prepaid account identifier" may include any identifier or other data suitable to identify a prepaid account. In some cases, a prepaid account identifier may be embossed on or be included in or stored on a prepaid device.

A "prepaid device" may be any device associated with a prepaid account. Examples of prepaid devices may include stored-value cards, merchant cards, gift cards, gift certificates, and debit cards, etc.

In some embodiments, the prepaid account may be loaded with a certain amount of funds during a purchase transaction. For example, the prepaid device may be sold at a merchant such as a retail establishment.

As used herein, a "account link database" may be any suitable database used to link a payment account to one or more prepaid accounts funded or paid for by the payment account. The account link database may be operable to retrieve one or more prepaid account identifiers using a payment account identifier, and to retrieve one or more payment account identifiers using a prepaid account identifier.

Embodiments of the invention enable an issuer, user, or other party to cancel prepaid accounts linked to a payment account in the event of fraud. Specifically, embodiments of the invention allow a prepaid account identifier linked to a payment account identifier to be retrieved. The prepaid account identifiers may then be used to cancel the prepaid account and transfer remaining funds in the account to an issuer computer associated with the payment account. This reduces the damage caused by fraudulent purchases of prepaid devices made with stolen or misappropriated payment account information and reduces the incentive for criminals to perform payment account fraud.

Embodiments of the invention can also counteract the use of prepaid devices to launder money. The account link database may allow law enforcement or other parties to determine prepaid accounts linked to a payment account. The transactions of these prepaid devices may be inspected to determine activities that may otherwise have been obfuscated from law enforcement or other parties monitoring the payment account.

Embodiments of the invention also provide the technical advantage of automatically generating an account link database comprising prepaid accounts linked to payment accounts. For example, a merchant computer may provide both a payment account identifier and a prepaid account identifier in an authorization request message requesting funds for a prepaid account, or in an activation request message requesting activation of the prepaid account. In some embodiments, the account identifiers can be received by a payment processing network and used to link a prepaid account to a payment account in an account link database. Thus, the account link database may be populated with minimal if any manual effort through an extension of existing messages used in payment transactions. The account link database may also be used to enable other functionality, such as facilitating loading funds from a payment account to a linked prepaid account.

Embodiments of the invention provide the further technical advantage of linking a prepaid account and a payment account without requiring the accounts to be associated with the same issuer, payment processing network, or payment type. Users may use a large variety of payment accounts to purchase a prepaid device, such as credit card accounts, checking accounts, online money transfer accounts, mobile payment accounts, wire transfer accounts, etc. Each of these payment accounts may have a differing payment method, and the payment methods may not share any common party. Prepaid accounts are similarly diverse; they may include stored-value accounts, gift card accounts, transit accounts, etc. However, as long as either authorization for funding the prepaid account or activation of prepaid account is conducted via a payment account associated with the prepaid account or the payment account, embodiments of the invention enable the accounts to be linked automatically.

I. Exemplary Payment Systems and Methods

FIG. 1 shows an exemplary system for using embodiments of the invention. The system includes a payment device 110 comprising a payment account identifier 111, a prepaid device 120 comprising a prepaid account identifier 121, an access device 130, a merchant computer 140, an acquirer computer 150 associated with the merchant 140, a payment processing network 160 connected to an account link database 200, and a payment account issuer computer 170. In a payment transaction, a user (not shown) may purchase services or goods such as a prepaid device 120 at the merchant computer 140 using payment device 110. The user may be an individual, or an organization such as a business that is capable of purchasing goods or services. The acquirer computer 150 can communicate with an payment account issuer computer 170 via a payment processing network 160.

A user (not shown) may use the payment device 110, for example, to make purchases. In one example, payment device 110 may be in the form of a payment card. The payment device may be associated with an issuer associated with payment account issuer computer 170.

The issuer is typically a business entity (e.g., a bank) which maintains financial accounts for the user and often issues a payment device such as a credit or debit card to the user. A merchant is typically an entity, such as a store, person, or service provider, that engages in transactions. An acquirer is typically a business entity, e.g., a commercial bank that has a business relationship with a particular merchant or other entity. Some entities can perform both issuer and acquirer functions. Embodiments of the invention encompass such single entity issuer-acquirers.

The payment processing network 160 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 160 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 160 may use any suitable wired or wireless network, including the Internet.

The merchant computer 140 may also include, or may receive communications from, an access device 130 that can interact with the payment device 110 and/or prepaid device 120. The access device 130 according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 130 is a point of sale terminal, any suitable point of sale terminal including card readers may be used. The card readers may include any suitable contact or contactless mode of operation. For example, exemplary card readers can include RF (radio frequency) antennas, magnetic stripe readers, etc. to interact with the payment device 110 or prepaid device 120.

The payment device 110 and prepaid device 120 may interact with access device 130 to electronically communicate a payment account identifier 111 or a prepaid account identifier 121 to the access device 130, respectively. The interaction may be initiated, in various embodiments, by swiping, tapping, bringing in proximity, or otherwise operating devices 110 and 120.

In some payment transactions, the user purchases a good or service at merchant 140 using a payment device 110. The user's payment device 110 can interact with an access device 130 at a merchant associated with merchant computer 140. For example, the user may swipe the payment device 200 at a card reader in the access device 130. Alternatively, the user may indicate payment details to the merchant electronically, such as in an online transaction.

An authorization request message may be generated by payment device 110 or merchant computer 140 and then forwarded to the acquirer computer 150. After receiving the authorization request message, the authorization request message is then sent to the payment processing network 160. The payment processing network 160 then forwards the authorization request message to the corresponding payment account issuer computer 170.

An "authorization request message" may be an electronic message that is sent to request authorization for a transaction. The authorization request message may be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include an issuer account identifier (e.g., a payment account identifier) that may be associated with a payment device or payment account. An authorization request message may also comprise additional data elements corresponding to "identification information" including, by way of example, a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the payment account issuer computer 170 receives the authorization request message, the payment account issuer computer 170 sends an authorization response message back to the payment processing network 160 to indicate whether the current transaction is authorized (or not authorized). The payment processing network 160 then forwards the authorization response message back to the acquirer computer 150. In some embodiments, payment processing network 160 may decline the transaction even if payment account issuer computer 170 has authorized the transaction, for example depending on a value of the fraud risk score. The acquirer computer 150 then sends the response message back to the merchant computer 140.

An "authorization response message" may be an electronic message reply to an authorization request message. The authorization response message may be generated by an issuing financial institution 170 or a payment processing network 160. The authorization response message may include, by way of example, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 160) to the merchant computer 140 that indicates approval of the transaction. The code may serve as proof of authorization. As noted above, in some embodiments, a payment processing network 160 may generate or forward the authorization response message to the merchant.

After the merchant computer 140 receives the authorization response message, the merchant computer 140 may then provide the authorization response message for the user. The response message may be displayed by the access device 130, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 160. A clearing process is a process of exchanging financial details between an acquirer and an issuer to facilitate posting to a customer's payment account and reconciliation of the user's settlement position.

Figure 2:
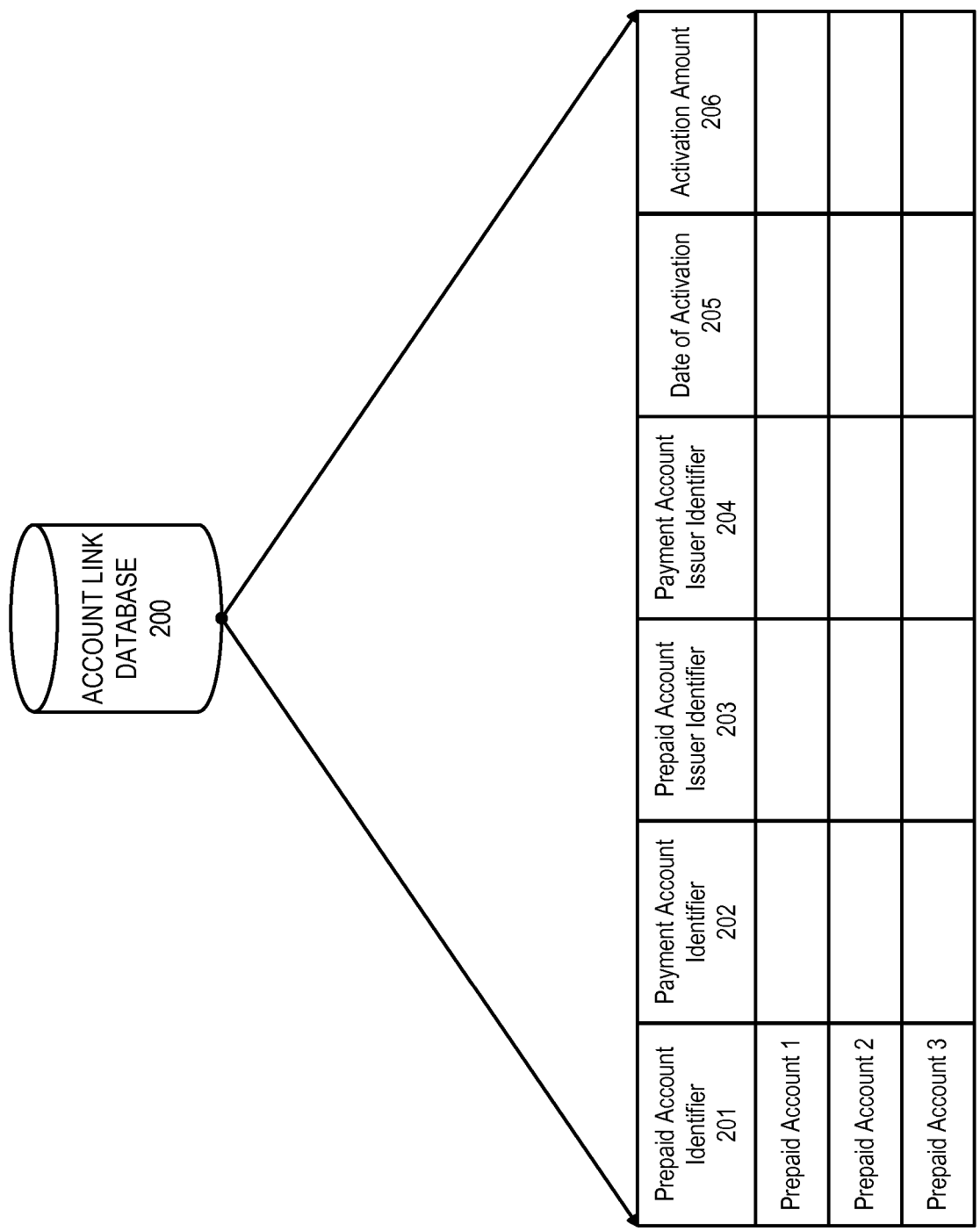
FIG. 2 illustrates an exemplary account link database.

FIG. 2 shows an exemplary account link database 200. Account link database 200 may be used to store data linking prepaid accounts and payment accounts.

Account link database 200 may comprise a plurality of fields, including a prepaid account identifier 201, payment account identifier 202, prepaid account issuer identifier 203, payment account issuer identifier 204, date of activation 205, and activation amount 206. Account link database 200 may comprise a plurality of records, each including values for at least one of fields 201-206.

Prepaid account identifier 201 may include any suitable prepaid account identifier (e.g., prepaid account identifier 121) or other data suitable to identify a prepaid account. In some embodiments, account link database 200 may be indexed by prepaid account identifier 201, so that records matching a prepaid account identifier may be quickly determined.

Payment account identifier 202 may include any payment account identifier (e.g., payment account identifier 111) linked to a prepaid account identifier 201. In some embodiments, account link database 200 may be indexed by payment account identifier 202, so that records matching a payment account identifier may be quickly determined.

Prepaid account issuer identifier 203 may include any identifier suitable to identify an issuer associated with a prepaid account identifier 201. For example, the prepaid account issuer identifier may be a bank identification number (BIN), a routing number, or any other suitable identifier. In some embodiments, prepaid account issuer identifier 203 may be used to determine a prepaid account issuer computer 180 to communicate with regarding the prepaid account, for example during step 603 of the method of FIG. 6.

Payment account issuer identifier 204 may include any identifier suitable to identify an issuer associated with a payment account identifier 202. For example, the payment account issuer identifier may be a bank identification number (BIN), a routing number, or any other suitable identifier. In some embodiments, payment account issuer identifier 204 may be used to determine a payment account issuer computer 170 to communicate with regarding the payment account, for example during step 605 of the method of FIG. 6.

Date of activation 205 may include any date, time, timestamp, or other data indicating when a prepaid account associated with prepaid account identifier 201 was activated. Date of activation 205 may, in some embodiments, be a time at which an authorization response message approving funds for the prepaid account was generated or received, or a time at which an activation response message activating the prepaid account was generated or received. In some embodiments, date of activation 205 may be used to conditionally cancel prepaid accounts. For example, if a credit card used for funding prepaid accounts was indicated as lost or stolen on Jan. 6, 2013, then only prepaid accounts activated on or after Jan. 6, 2013 may be canceled. Prepaid accounts activated before Jan. 6, 2013 may remain valid because such prepaid accounts may have been valid purchases made by the authorized credit cardholder.

Activation amount 206 may include any number or other indication of an amount of currency used to fund the prepaid account. In some embodiments, activation amount 206 may include a currency and monetary used for funding (e.g., $250 USD). Activation amount 206 may in some embodiments be determined from an authorization request message or an activation request message.

II. Exemplary Prepaid Account Funding Methods

Figure 3:
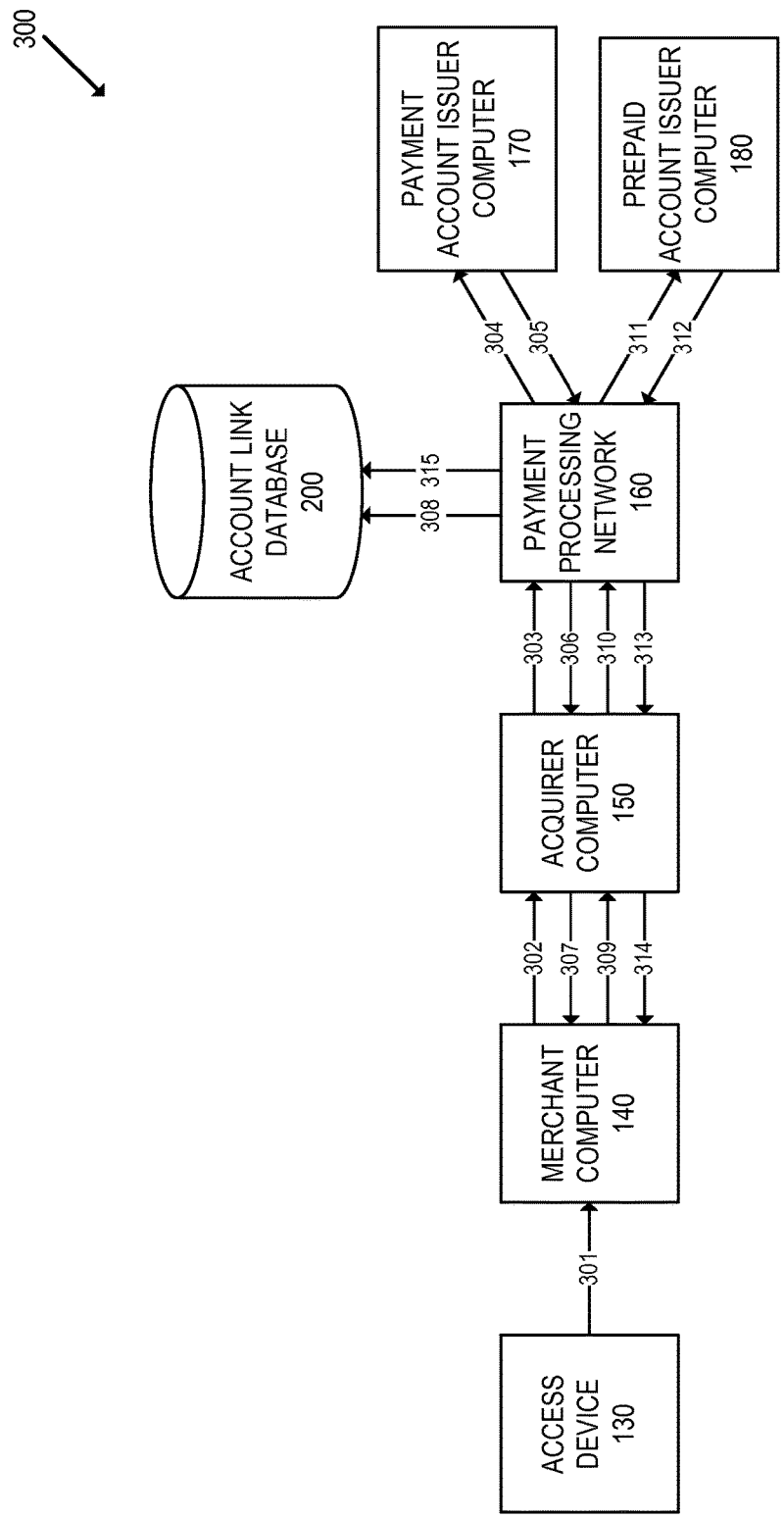
FIG. 3 shows a flow diagram for authorizing funds and activating a prepaid account in some embodiments of the invention.

FIG. 3 shows a flow diagram 300 for authorizing funds and activating a prepaid account in some embodiments of the invention.

At step 301, access device 130 sends a payment account identifier 111 associated with a with a payment account, and prepaid account identifier 121 associated with a prepaid account to a merchant computer 140. In some embodiments, the identifiers 111 and 121 may be read from devices 110 and 120, respectively, by the access device 130. For example, in some embodiments, the merchant may swipe or tap the devices 110 and 120 on access device 130. In other embodiments, the merchant may manually enter a payment account identifier 111 or prepaid account identifier 121 into the access device 130 (e.g., using a keypad). The merchant may also enter a desired amount of funds to be loaded to the prepaid account into access device 130.

At step 302, merchant computer 140 generates and sends an authorization request message requesting funds from the payment account for activation of the prepaid account. The authorization request message may include the payment account identifier 111. In some embodiments, the authorization request message may be sent to an acquirer computer 150, which may forward the message to payment processing network 160.

At step 303, payment processing network 160 receives and processes the authorization request message. In addition, at step 303 payment processing network 160 determines a payment account issuer computer 170 associated with payment account identifier 111 received in the authorization request message.

At step 304, payment processing network 160 forwards the authorization request message to the determined payment account issuer computer 170. Payment account issuer computer 170 may then process the authorization request and determine whether to approve or decline the request. The determination may be made based on a variety of factors, such as the account balance of the payment account and the likelihood that the authorization request is fraudulent.

At step 305, payment account issuer computer 170 sends to payment processing network 160 an authorization response message including an indication of whether authorization is approved or declined.

At step 306, the authorization response message is sent to acquirer computer 150. At step 307, the authorization response is sent to merchant computer 140.

At step 308, payment processing network 160 stores the payment account identifier 111 in account link database 200.

At step 309, if the authorization response message indicates that funding is approved, merchant computer 140 generates and sends an activation request message requesting activation of the prepaid account. Typically, the activation request message includes the prepaid account identifier 121. In some embodiments, the activation request message may be sent to an acquirer computer 150, which may forward the message to payment processing network 160.

At step 310, payment processing network 160 receives and processes the activation request message. In addition, at step 310 payment processing network 160 determines a prepaid account issuer computer 180 associated with prepaid account identifier 121 included in the activation request message.

At step 311, payment processing network 160 forwards the activation request message to the determined prepaid account issuer computer 180. Prepaid account issuer computer 180 may then process the activation request and determine whether to activate the prepaid account. The determination may be made based on a variety of factors, such as the authorization of funds and the likelihood that the activation request is fraudulent.

At step 312, prepaid account issuer computer 180 sends to payment processing network 160 an activation response message including an indication of whether the prepaid account has been activated.

At step 313, the activation response message is sent to acquirer computer 150. At step 314, the activation response is sent to merchant computer 140, which may then notify the user that the prepaid account has been activated.

At step 315, payment processing network 160 stores the prepaid account identifier 121 in account link database 200.

The method of FIG. 3 may link the prepaid account to the payment account in any suitable manner. For example, in some embodiments, a transaction identifier associated with the authorization for funds from the payment account may be saved in account link database 200 in a record associated with the payment account identifier and returned to merchant computer 140. Merchant computer 140 may include the transaction identifier in the activation request message. Subsequently, payment processing network 160 may use the transaction identifier to retrieve the corresponding record in the account link database 200 and link the accounts.

In some embodiments, subsequent to step 315, merchant computer 140 may transmit an additional message to payment processing network 160 indicating the prepaid account identifier 121 and payment account identifier 111 to be linked. Additional methods 400 and 500 for linking the prepaid account to the payment account are shown in FIGS. 4 and 5, respectively.

Figure 4:
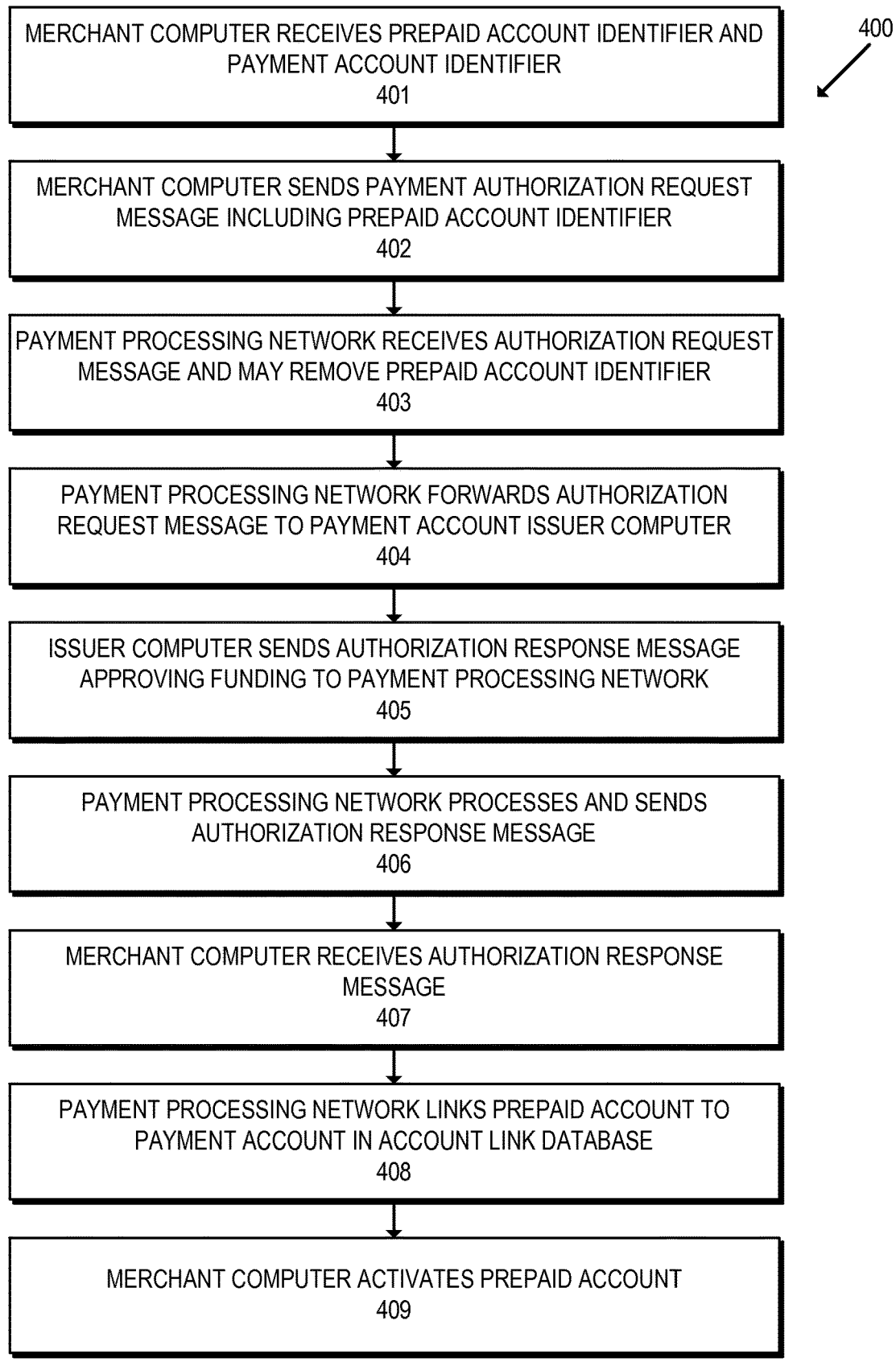
FIG. 4 shows a method for linking a prepaid account and a payment account in some embodiments of the invention.
Figure 5:
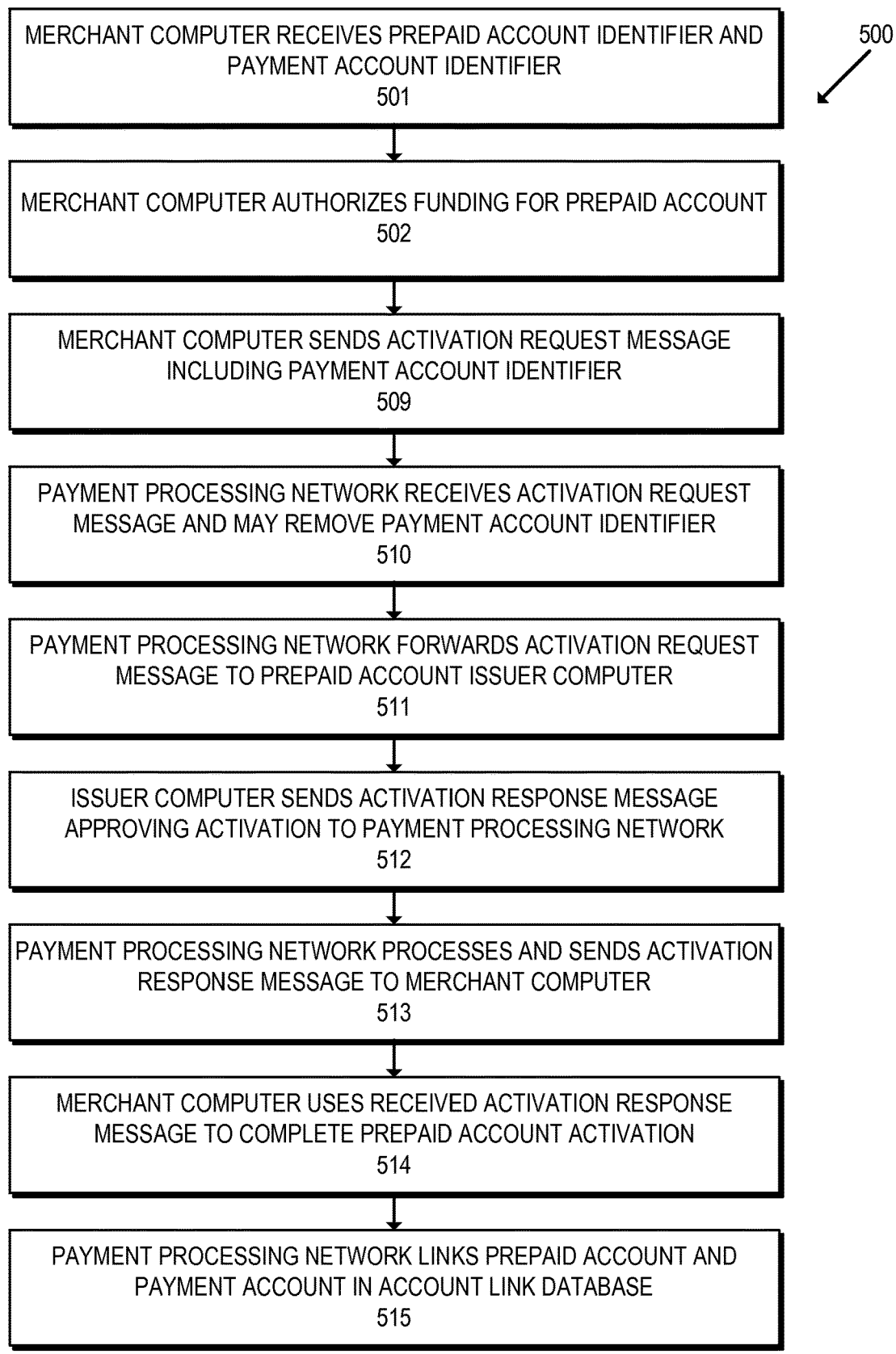
FIG. 5 shows another method for linking a prepaid account and a payment account in some embodiments of the invention.

FIG. 4 shows a method 400 for linking a prepaid account and a payment account in some embodiments of the invention. Steps 401-408 of method 400 are similar to the corresponding method steps 301-308 illustrated in FIG. 3. However, the addition of a prepaid account identifier 121 in the authorization request message allows payment processing network 160 to link the prepaid account to the payment account.

At step 401, merchant computer 140 receives a payment account identifier 111 associated with a with a payment account, and prepaid account identifier 121 associated with a prepaid account. The payment account identifier 111 and prepaid account identifier 121 may be received in any suitable manner, including those described above for step 302 in the method of FIG. 3.

At step 402, merchant computer 140 generates and sends an authorization request message requesting funds for activation from the payment account. In addition to the payment account identifier 111, the authorization request message comprises prepaid account identifier 121. In some embodiments, prepaid account identifier 121 may be included in an existing field in the authorization request message. For example, in authorization request messages adhering to the International Organization for Standardization (ISO) 8583 standard, field 104 ("Transaction Description") may include the prepaid account identifier 121. In other cases, the prepaid account identifier 121 may be included in fields 102 or 103 ("Account Identification" 1 and 2, respectively). In other cases, the prepaid account identifier 121 may be included in field 124 ("Info text"). In other embodiments, other existing fields or a new field may be defined for the prepaid account identifier 121.

The authorization request message may be sent to an acquirer computer 150, which may forward the message to payment processing network 160.

At step 403, payment processing network 160 receives the authorization request message comprising the payment account identifier 111 and the prepaid account identifier 121. In some embodiments, payment processing network 160 may store a provisional record in the account link database 200 including the identifiers 111 and 121. For example, the prepaid account identifier 121 may be stored in field 201, and the payment account identifier 111 may be stored in field 202. In addition, a prepaid account issuer identifier and a payment account issuer identifier may be determined from the authorization request message and stored in corresponding fields 203 and 204, respectively. The date of activation 205 and activation amount 206 for the record may be left blank, since the prepaid account has not been activated.

In addition, at step 403 payment processing network 160 determines a payment account issuer computer 170 associated with payment account identifier 111 included in the authorization request.

At step 404, payment processing network 160 forwards the authorization request message to the determined payment account issuer computer 170. In some embodiments, the payment processing network 160 may remove the prepaid account identifier 121 from the forwarded authorization request message. The prepaid account identifier 121 may be removed for a variety of reasons, such as allowing the authorization request message to be sent to the payment account issuer computer 170 in a standard format, or for privacy of the prepaid account identifier 121.

Once the payment account issuer computer 170 receives the authorization request message, the issuer computer 170 may process the authorization request and determine whether to approve or decline the request.

At step 405, payment account issuer computer 170 sends an authorization response message to payment processing network 160 including an indication of whether authorization is approved or declined.

At step 406, the payment processing network 160 processes and sends the authorization response message. The authorization response may be sent via an acquirer computer 150. At step 407, merchant computer 140 receives the authorization response message.

At step 408, if the authorization response message indicates that funding is approved, payment processing network 160 links the prepaid account to the payment account using the prepaid account identifier 121 and the payment account identifier 111. Linking the prepaid account to the payment account may cause, for example, payment processing network 160 to finalize the provisional record stored in account link database 200 by updating the date of activation 205 and activation amount 206. Thus, after step 408, the prepaid account and payment account are linked.

At step 409, if the authorization response message indicates that funding is approved, merchant computer 140 activates the prepaid account. In some embodiments, activating the prepaid account may include steps 309-314 as described for FIG. 3. In other embodiments, activating the prepaid account may include steps 509-515 as described for FIG. 5. In yet other embodiments, activation may be performed using another method (e.g., a closed-loop activation procedure).

FIG. 5 shows a method 500 for linking a prepaid account and a payment account in some embodiments of the invention. Steps 509-514 of method 500 are similar to the corresponding method steps 309-314 illustrated in FIG. 3. However, the addition of a payment account identifier 111 in the activation request message allows payment processing network 160 to link the prepaid account to the payment account.

At step 501, merchant computer 140 receives a payment account identifier 111 associated with a with a payment account, and prepaid account identifier 121 associated with a prepaid account. The payment account identifier 111 and prepaid account identifier 121 may be received in any suitable manner, including those described above for step 302 in the method of FIG. 3.

At step 502, merchant computer 140 authorizes funding for the prepaid account. In some embodiments, authorizing funding for the prepaid account may include steps 302-308 as described for FIG. 3. In other embodiments, authorizing funding for the prepaid account may include steps 402-408 as described for FIG. 4. In yet other embodiments, funding for the prepaid account may be performed using another method (e.g., an online payment, personal check, or wire transfer).

At step 509, if funding for the prepaid account is authorized, merchant computer 140 generates and sends an activation request message requesting activation of the prepaid account. In addition to the prepaid account identifier 121, the activation request message includes the payment account identifier 111.

In some embodiments, payment account identifier 111 may be included in an existing field in the activation request message. For example, in activation request messages adhering to the International Organization for Standardization (ISO) 8583 standard, field 104 ("Transaction Description") may include the payment account identifier 111. In other cases, the payment account identifier 111 may be included in fields 102 or 103 ("Account Identification" 1 and 2, respectively). In other cases, the payment account identifier 111 may be included in field 124 ("Info text"). In other embodiments, a new field may be defined for the payment account identifier 111.

In some embodiments, the activation request message may be sent to an acquirer computer 150, which may forward the message to payment processing network 160.

At step 510, payment processing network 160 receives and processes the activation request message. In some embodiments, payment processing network 160 may store a provisional record in the account link database 200 including payment account identifier 111 and prepaid account identifier 121. For example, the prepaid account identifier 121 may be stored in field 201, and the payment account identifier 111 may be stored in field 202. In addition, a prepaid account issuer identifier and a payment account issuer identifier may be determined from the activation request message and stored in corresponding fields 203 and 204, respectively. The date of activation 205 and activation amount 206 for the record may be left blank, since the prepaid account has not yet been activated.

In some cases, such as if step 502 was performed in accordance with steps 402-408 of FIG. 4 during authorization of funds for activation of the prepaid account, a record in account link database 200 may already exist for the payment account identifier 111 and prepaid account identifier 121. In such cases, a new provisional record may not be created in order to avoid duplication of data.

In addition, at step 510 payment processing network 160 determines a prepaid account issuer computer 180 associated with prepaid account identifier 121 included in the activation request message.

At step 511, payment processing network 160 forwards the activation request message to the determined prepaid account issuer computer 180. In some embodiments, the payment processing network 160 may remove the payment account identifier 111 from the forwarded activation request message. The payment account identifier 111 may be removed for a variety of reasons, such as allowing the activation request message to be sent to the prepaid account issuer computer 180 in a standard format, or for privacy of the payment account identifier 111. Prepaid account issuer computer 180 may then process the activation request and determine whether to activate the prepaid account.

At step 512, prepaid account issuer computer 180 sends to payment processing network 160 an activation response message including an indication of whether the prepaid account has been activated.

At step 513, the activation response message is sent to acquirer computer 150. At step 514, the activation response is sent to merchant computer 140, which may then notify the user whether the prepaid account has been activated.

At step 515, if the activation response message indicates that the prepaid account has been activated, payment processing network 160 links the prepaid account and payment account in the account link database. Linking the prepaid account to the payment account may cause, for example, payment processing network 160 to finalize the provisional record stored in account link database 200 by updating the date of activation 205 and activation amount 206. Thus, after step 515, the prepaid account and payment account are linked.

In some cases, such as if a record already exists in account link database 200 indicating that the prepaid account and payment account are linked, at step 515 the record may be updated with new data (e.g., the time at which the activation response message was generated or received, or the final activation amount for the prepaid account).

It should be noted that FIGS. 3-5 are intended to be descriptive, but not limiting. For example, although the prepaid account and payment account are described above as being linked in step 408 of method 400, and step 515 of method 500, in various embodiments the accounts may be linked at other suitable times. For example, the payment account and prepaid account may be linked once the corresponding authorization response message (for method 400) or activation response message (for method 500) is received by payment processing network 160 (e.g., at step 406 or 513). Alternatively, the accounts may be linked once the authorization request message (for method 400) or activation request message (for method 500) is received by payment processing network 160 (e.g., at step 403 or 510). Such embodiments may have the advantage of requiring less processing.

III. Exemplary Account Cancelling Methods

Figure 6:
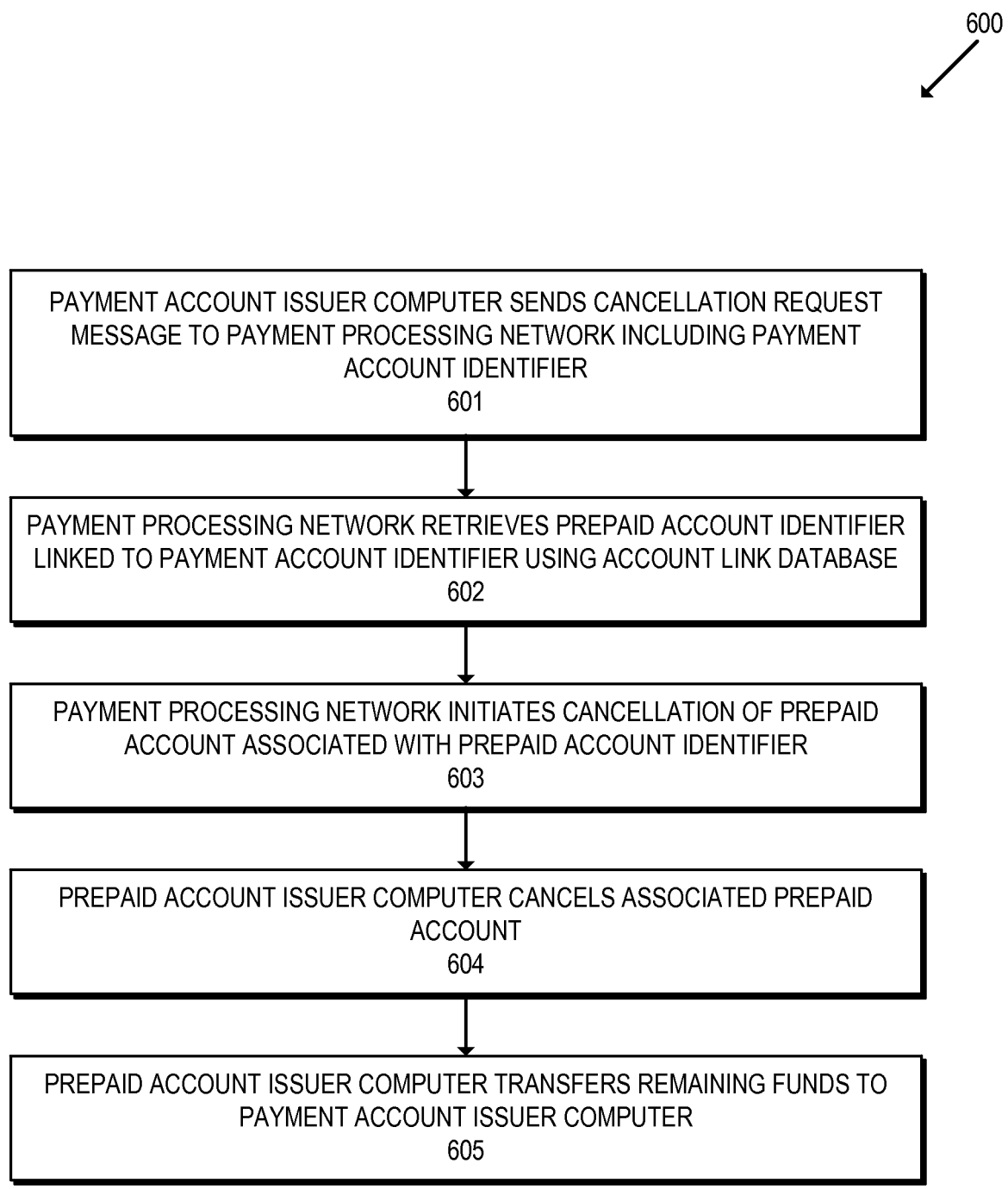
FIG. 6 shows a method for cancelling a prepaid account.

FIG. 6 shows a method 600 for cancelling a prepaid account. Method 600 may be performed for a prepaid account that has been previously linked to a payment account (e.g., through methods 400 or 500). The payment account may be canceled for any suitable reason, such as upon the detection of fraudulent charges on the payment account.

At step 601, payment account issuer computer 170 sends a cancellation request message to payment processing network 160 including the payment account identifier 111 for the payment account to be canceled. In some embodiments, the cancellation request message may include a date of compromise indicating the date of when a payment account may have been compromised. Prepaid accounts activated after the date of compromise can be canceled.

At step 602, payment processing network 160 retrieves a prepaid account identifier 121 linked to the received payment account identifier 111 using the account link database 200. In some embodiments, an index may be used to determine records with a payment account identifier field 202 matching the received payment account identifier 111. In some cases, multiple records may match, indicating multiple prepaid accounts linked to the payment account. For each matching record, the prepaid account identifier 201 is determined.

At step 603, payment processing network 160 initiates cancellation of the prepaid account associated with the retrieved prepaid account identifier 201. In some embodiments, initiating the cancellation may involve sending cancellation request messages to prepaid account issuer computers 180 associated with the prepaid accounts. In some embodiments, payment processing network 160 may compare the date of compromise to the date of activation 206 in the matched records, and initiate cancellation of only those of the prepaid accounts that were activated on or after the date of compromise. This may allow legitimate prepaid accounts funded before the date of compromise to remain valid and usable.

At step 604, prepaid account issuer computer 180 cancels the prepaid account. Cancellation of the prepaid account may include, for example, freezing the funds in the prepaid account and preventing any further transactions using the prepaid account.

In some embodiments, at step 605, prepaid account issuer computer 180 may transfer any remaining funds in the canceled prepaid account to the payment account issuer. In some embodiments, the funds may be transferred to the payment account, sent to the user associated with the payment account (e.g., as a check), or may be kept (e.g., in escrow) by the payment account issuer if the payment account is compromised.

IV. Additional Embodiments

In some embodiments of the invention, account link database 200 may be used for purposes other than those described above. For example, the account link database 200 may be used to facilitate reloading prepaid accounts using funds associated with the payment account. In some embodiments, if an account balance for a prepaid account drops below a threshold value, the prepaid account may be re-loaded with funds from the linked payment account stored in account link database 200.

V. Exemplary Computer Apparatus

Figure 7:
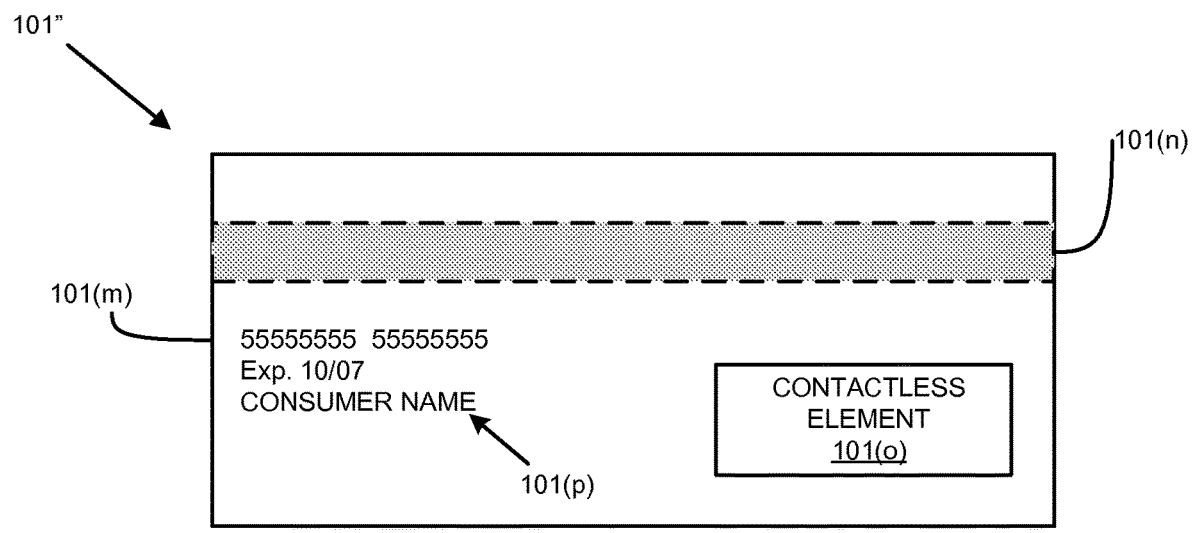
FIG. 7 shows an exemplary payment device.

FIG. 7 shows an example of a payment device 101" in the form of a card. As shown, the payment device 101" comprises a plastic substrate 101(*m*). In some embodiments, a contactless element 101(*o*) for interfacing with an access device 102 may be present on, or embedded within, the plastic substrate 101(*m*). User information 101(*p*) such as an account number, expiration date, and/or a user name may be printed or embossed on the card. A magnetic stripe 101(*n*) may also be on the plastic substrate 101(*m*). In some embodiments, the payment device 101" may comprise a microprocessor and/or memory chips with user data stored in them.

As noted above and shown in FIG. 7, the payment device 101" may include both a magnetic stripe 101(*n*) and a contactless element 101(*o*). In some embodiments, both the magnetic stripe 101(*n*) and the contactless element 101(*o*) may be in the payment device 101". In some embodiments, either the magnetic stripe 101(*n*) or the contactless element 101(*o*) may be present in the payment device 101.

Figure 8:
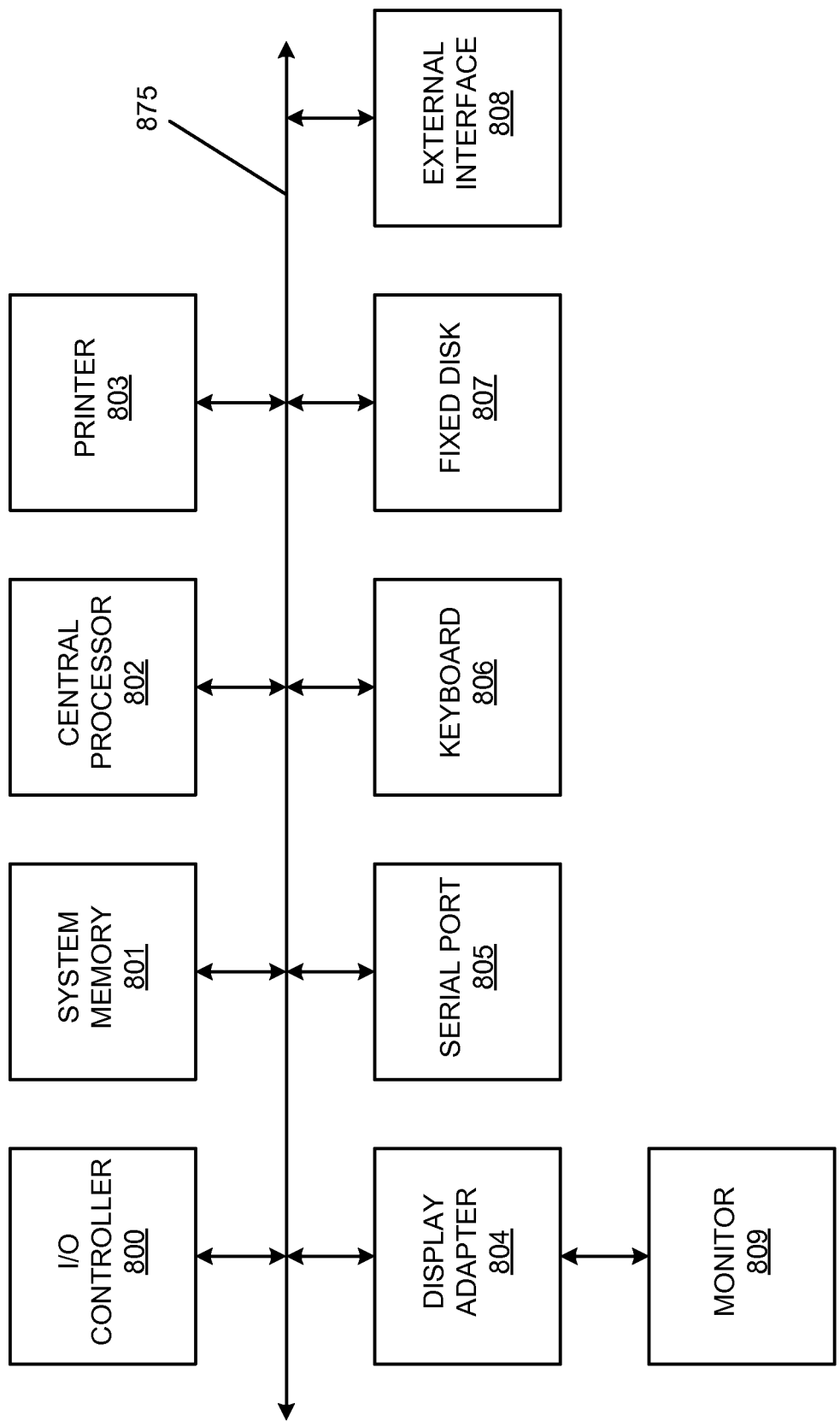
FIG. 8 shows a block diagram of an exemplary computer apparatus.

FIG. 8 is a high level block diagram of a computer system that may be used to implement any of the entities or components described above. The subsystems shown in FIG. 8 are interconnected via a system bus 875. Additional subsystems include a printer 803, keyboard 806, fixed disk 807, and monitor 809, which is coupled to display adapter 804. Peripherals and input/output (I/O) devices, which couple to I/O controller 800, can be connected to the computer system by any number of means known in the art, such as a serial port. For example, serial port 805 or external interface 808 can be used to connect the computer apparatus to a wide area network such as the Internet, a mouse input device, or a scanner. The interconnection via system bus 875 allows the central processor 802 to communicate with each subsystem and to control the execution of instructions from system memory 801 or the fixed disk 807, as well as the exchange of information between subsystems. The system memory 801 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A server computer comprising:
a processor; and
a non-transitory computer-readable medium, comprising code executable by the processor for implementing a method comprising:
linking a prepaid account to a payment account by storing a record in an account link database connected to the server computer, the record comprising a prepaid account identifier and a payment account identifier, wherein the prepaid account identifier is retrievable using the payment account identifier;
receiving a payment account cancellation request message including the payment account identifier;
retrieving the prepaid account identifier linked to the payment account identifier included in the payment account cancellation request message;
initiating cancellation of the prepaid account associated with the retrieved prepaid account identifier, wherein the payment account cancellation request message further comprises a date of compromise of the payment account and the prepaid account is activated after the date of compromise; and
in response to initiating cancellation of the prepaid account associated with the retrieved prepaid account identifier, initiating refunding of funds in the prepaid account to a payment account issuer associated with the payment account to be cancelled.

2. The server computer of claim 1, wherein the prepaid account identifier and the payment account identifier are received by the processor in an authorization request message to fund the prepaid account, and wherein the method further comprises:
sending, by the processor, the authorization request message to a payment account issuer computer associated with the payment account; and
receiving, by the processor, an authorization response message indicating that the funding is approved, wherein linking the prepaid account to the payment account is performed after the funding is approved.

3. The server computer of claim 2, wherein the prepaid account identifier is removed by the processor from the authorization request message sent to the payment account issuer computer.

4. The server computer of claim 1, wherein the prepaid account identifier and the payment account identifier are received by the processor in an activation request message to activate the prepaid account prior to receiving the payment account cancellation request message, and wherein the method further comprises:
sending, by the processor, the activation request message to a prepaid account issuer computer associated with the prepaid account; and
receiving, by the processor, an activation response message indicating that the prepaid account is activated, wherein linking the prepaid account to the payment account is performed after the prepaid account is activated.

5. The server computer of claim 4, wherein the prepaid account identifier is removed by the processor from the activation request message sent to the prepaid account issuer computer.

6. A computer-implemented method comprising:
receiving, by a processor, a payment account cancellation request message including a payment account identifier for a prepaid account;
retrieving, by the processor, a prepaid account identifier linked to the payment account identifier included in the payment account cancellation request message;
initiating, by the processor, cancellation of the prepaid account associated with the retrieved prepaid account identifier, wherein the payment account cancellation request message further comprises a date of compromise of a payment account associated with the prepaid account and the prepaid account is activated after the date of compromise; and
in response to initiating cancellation of the prepaid account associated with the retrieved prepaid account identifier, initiating, by the processor, refunding of funds in the prepaid account to a payment account issuer associated with the payment account to be cancelled.

7. The computer-implemented method of claim 6, wherein the prepaid account identifier and payment account identifier are received by the processor in an authorization request message to fund the prepaid account, and wherein the method further comprises:
sending, by the processor, the authorization request message to a payment account issuer computer associated with the payment account; and
receiving, by the processor, an authorization response message indicating that the funding is approved, wherein linking of the prepaid account to the payment account is performed after the funding is approved.

8. The computer-implemented method of claim 7, wherein the prepaid account identifier is removed by the processor from the authorization request message sent to the payment account issuer computer.

9. The computer-implemented method of claim 6, wherein the prepaid account identifier and payment account identifier are received by the processor in an activation request message to activate the prepaid account prior to receiving the payment account cancellation request message, and wherein the method further comprises:
sending, by the processor, the activation request message to a prepaid account issuer computer associated with the prepaid account; and
receiving, by the processor, an activation response message indicating that the prepaid account is activated, wherein linking the prepaid account to the payment account is performed after the prepaid account is activated.

10. The computer-implemented method of claim 9, wherein the prepaid account identifier is removed by the processor from the activation request message sent to the prepaid account issuer computer.

* * * * *